United States Patent
Soucek et al.

(10) Patent No.: US 10,035,903 B2
(45) Date of Patent: Jul. 31, 2018

(54) MODIFIED SOYBEAN OIL-EXTENDED SBR COMPOUNDS AND VULCANIZATES FILLED WITH CARBON BLACK

(71) Applicants: Mark Soucek, Akron, OH (US); Avraam Isayev, Fairlawn, OH (US)

(72) Inventors: Mark Soucek, Akron, OH (US); Avraam Isayev, Fairlawn, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 15/037,154

(22) PCT Filed: Nov. 18, 2014

(86) PCT No.: PCT/US2014/066111
§ 371 (c)(1),
(2) Date: May 17, 2016

(87) PCT Pub. No.: WO2015/074035
PCT Pub. Date: May 21, 2015

(65) Prior Publication Data
US 2016/0272795 A1    Sep. 22, 2016

Related U.S. Application Data

(60) Provisional application No. 61/905,479, filed on Nov. 18, 2013.

(51) Int. Cl.
*C08L 9/06* (2006.01)
*C08L 91/00* (2006.01)

(52) U.S. Cl.
CPC .............. *C08L 9/06* (2013.01); *C08L 91/00* (2013.01); *C08L 2205/06* (2013.01); *C08L 2207/322* (2013.01)

(58) Field of Classification Search
CPC ... C08L 9/06; C08L 2205/06; C08L 2207/322
See application file for complete search history.

(56) References Cited

U.S. PATENT DOCUMENTS

2005/0131127 A1* 6/2005 Wilson, III ............ A43B 13/04
524/492
2011/0184093 A1* 7/2011 Perry ........................ C08K 5/01
524/19

OTHER PUBLICATIONS

Chen et al., Synthesis and photo-polymerization of norbornyl epoxided linseed Polymer 43 (2002) 5379-5389.*
Chen et al. Synthesis and photopolymerization of norbornyl epoxidized linseed oil. Polymer. Sep. 2002. vol. 43. No. 20. pp. 5379-5389.
Xia et al. Vegetable oil-based polymeric materials: synthesis, properties, and applications. Green Chemistry. 2010. vol. 11. pp. pp 1893-1909.

* cited by examiner

*Primary Examiner* — Robert Harlan
(74) *Attorney, Agent, or Firm* — Renner Kenner Greive Bobak Taylor & Weber (57) ABSTRACT

Rubber formulations include a rubber and a norbornylized seed oil. The norbornylized seed oil is a seed oil that is modified with norbornylene groups. The norbornylized seed oil can replace petroleum oils currently often used in rubber formulations. A process for creating a rubber formulation includes the steps of adding a norbornylized seed oil to a rubber, wherein the norbornylized seed oil is a seed oil modified with norbornylene groups.

21 Claims, 2 Drawing Sheets

MODIFIED SOYBEAN OIL-EXTENDED SBR COMPOUNDS AND VULCANIZATES FILLED WITH CARBON BLACK

CROSS-REFERENCE TO RELATED APPLICATIONS

The present application claims priority to U.S. Provisional Patent Application Ser. No. 61/905,479, filed Nov. 18, 2013, the entirety of which is incorporated herein by reference.

FIELD OF THE INVENTION

The present invention generally relates to a rubber formulation including a rubber and norbornylized seed oil.

BACKGROUND OF THE INVENTION

Various types of petroleum oils are added to the rubber formulations in order to reduce viscosity, improve processing properties, increase low temperature flexibilities and decrease cost. However, polycyclic aromatic hydrocarbons (PAH), which are the main constituent of aromatic oils for rubber formulations, are highly carcinogenic. Therefore, there are benefits from the use of safe oils such as seed oils instead.

Soybean oil could be an excellent resource to replace petroleum oils in various fields. Efforts of replacing the conventional petroleum oils with soybean oil were made by many researchers. Soybean oil can be hydrogenated and used in food industries, or can be epoxidized and used in PVC and coatings. Soybean oil can also be used to produce bio-fuel, polyols and polyurethanes. In rubber industry, soybean oil can be added directly or be vulcanized and used as a plasticizer in the rubber matrix.

Soybean oil can be used as a replacement of conventional petroleum plasticizer. However, it is still necessary to further advance the usage of soybean oil in the rubber formulations to obtain improved properties over similar formulations using petroleum oils.

SUMMARY OF THE INVENTION

In a first embodiment, the present invention provides a rubber formulation comprising a rubber including norbornylized seed oil, wherein norbornylized seed oil is a seed oil modified with norbornylene groups.

In a second embodiment, the present invention provides a rubber formulation as in the first embodiment, wherein the rubber is selected from natural and synthetic rubbers.

In a third embodiment, the present invention provides a rubber formulation as in either the first or second embodiments, wherein the rubber is selected from styrene-butadiene rubber, natural rubber, isoprene rubber, butadiene rubber, butyl rubber, halogenated copolymer of isoprene and isobutylene rubbers, ethylene vinyls acetate copolymer rubber, polyurethane rubber, chlorinated polyethylene rubber, chlorosulfonated polyethylene rubber, acrylic rubber, thermoplastic elastomer rubber, polysulfide rubber, polynorbornene rubber, polychloroprene rubber, silicone rubber, fluoropolymer rubber, nitrile rubber, hydrogenated nitrile rubber, EPDM rubber, or the like.

In a fourth embodiment, the present invention provides a rubber formulation as in any of the first through third embodiments, wherein the rubber is selected from blend of synthetic rubber and synthetic rubber or blend of synthetic rubber and natural rubber.

In a fifth embodiment, the present invention provides a rubber formulation as in any of the first through fourth embodiments, wherein the seed oil is selected from soybean oil, linseed oil, sunflower oil, safflower oil, palm oil, kernel oil, or the like.

In a sixth embodiment, the present invention provides a rubber formulation as in any of the first through fifth embodiments, wherein the seed oil, prior to modification with norbornylene groups, has fatty acid chains with carbon-carbon double bonds, and the seed oil is modified with norbornylene groups by having at least some of said carbon-carbon double bonds converted into norbornylene groups.

In a seventh embodiment, the present invention provides a rubber formulation as in any of the first through sixth embodiments, wherein from 3% or more to 50% or less of the carbon-carbon double bonds of the seed oil is converted into norbornylene groups.

In an eighth embodiment, the present invention provides a rubber formulation as in any of the first through seventh embodiments, wherein from 3% or more to 20% or less of the carbon-carbon double bonds of the seed oil is converted into norbornylene groups.

In a ninth embodiment, the present invention provides a rubber formulation as in any of the first through eighth embodiments, wherein the rubber formulation includes from 5 to 40 parts norbornylized seed oil per hundred parts rubber.

In a tenth embodiment, the present invention provides a rubber formulation as in any of the first through ninth embodiments, wherein the rubber formulation includes from 10 to 30 parts norbornylized seed oil per hundred parts rubber.

In an eleventh embodiment, the present invention provides a rubber formulation as in any of the first through tenth embodiments, wherein the rubber formulation further comprises a filler selected from carbon black, silica filler, nanoclay, carbon nanotubes, carbon nanofibers, nanodiamonds, graphite, graphene and mixtures thereof.

In a twelfth embodiment, the present invention provides a rubber formulation as in any of the first through eleventh embodiments, wherein the rubber formulation includes from 20 to 100 parts of the filler per hundred parts rubber.

In a thirteenth embodiment, the present invention provides a rubber formulation as in any of the first through twelfth embodiments, wherein the rubber formulation includes from 30 to 80 parts of the filler per hundred parts rubber.

In a fourteenth embodiment, the present invention provides a rubber formulation as in any of the first through thirteenth embodiments, wherein the rubber is a natural and synthetic rubber and the norbornylized seed oil is norbornylized soybean oil.

In a fifteenth embodiment, the present invention provides a process for creating a rubber formulation comprising the steps of adding a norbornylized seed oil to a rubber, wherein the norbornylized seed oil is a seed oil modified with norbornylene groups.

In a sixteenth embodiment, the present invention provides a process for creating a rubber formulation as in the fifteenth embodiment, wherein the rubber is selected from natural and synthetic rubbers.

In a seventeenth embodiment, the present invention provides a process for creating a rubber formulation as in either the fifteenth or sixteenth embodiments, wherein the rubber is selected from styrene-butadiene rubber, natural rubber, isoprene rubber, butadiene rubber, butyl rubber, halogenated copolymer of isoprene and isobutylene rubbers, ethylene vinyls acetate copolymer rubber, polyurethane rubber, chlorinated polyethylene rubber, chlorosulfonated polyethylene rubber, acrylic rubber, thermoplastic elastomer rubber, polysulfide rubber, polynorbornene rubber, polychloroprene rubber, silicone rubber, fluoropolymer rubber, nitrile rubber, hydrogenated nitrile rubber, EPDM rubber or the like.

In an eighteenth embodiment, the present invention provides a process for creating a rubber formulation as in any of the fifteenth through seventeenth embodiments, wherein the seed oil is selected from soybean oil, linseed oil, sunflower oil, safflower oil, palm oil, kernel oil, or the like.

In a nineteenth embodiment, the present invention provides a process for creating a rubber formulation as in any of the fifteenth through eighteenth embodiments, wherein the process further comprises the step of creating the norbornylized seed oil by reacting the seed oil with dicyclopentadiene.

In a twentieth embodiment, the present invention provides a process for creating a rubber formulation as in any of the fifteenth through nineteenth embodiments, wherein, in the step of creating the norbornylized seed oil, the stoichiometric ratio of dicyclopentadiene to carbon-carbon double bonds of the seed oil is from 1 to 10 to 5:1.

In a twenty-first embodiment, the present invention provides a process for creating a rubber formulation as in any of the fifteenth through twentieth embodiments, wherein, in the step of creating the norbornylized seed oil, at least 5% or more to 40% or less of the carbon-carbon double bonds of the seed oil are converted into norbornylene groups.

In a twenty-second embodiment, the present invention provides a process for creating a rubber formulation as in any of the fifteenth through twenty-first embodiments, wherein, in the step of adding a norbornylized seed oil, from 3 to 40 parts norbornylized seed oil per hundred parts rubber is added to the rubber.

In a twenty-third embodiment, the present invention provides a process for creating a rubber formulation as in any of the fifteenth through twenty-second embodiments, wherein, in the step of adding a norbornylized seed oil, from 10 to 30 parts norbornylized seed oil per hundred parts rubber is added to the rubber.

In a twenty-fourth embodiment, the present invention provides a process for creating a rubber formulation as in any of the fifteenth through twenty-third embodiments, the process further comprises the step of adding a filler to the rubber, wherein the filler is selected from carbon black, silica filler, nanoclay, carbon nanotubes, carbon nanofibers, nanodiamonds, graphite, graphene and mixtures thereof.

In a twenty-fifth embodiment, the present invention provides a process for creating a rubber formulation as in any of the fifteenth through twenty-fourth embodiments, wherein, the step of adding the filler includes adding from 5 to 100 parts filler per hundred parts rubber.

In a twenty-sixth embodiment, the present invention provides a process for creating a rubber formulation as in any of the fifteenth through twenty-fifth embodiments, wherein, the step of adding the filler includes adding from 10 to 80 parts filler per hundred parts rubber.

In a twenty-seventh embodiment, the present invention provides a process for creating a rubber formulation as in any of the fifteenth through twenty-sixth embodiments, wherein, the step of adding the filler includes adding from 10 to 80 parts carbon black per hundred parts rubber.

In a twenty-eighth embodiment, the present invention provides a process for creating a rubber formulation as in any of the fifteenth through twenty-seventh embodiments, wherein the rubber is styrene-butadiene rubber and the norbornylized seed oil is norbornylized soybean oil.

In a twenty-ninth embodiment, the present invention provides a process for creating a rubber formulation as in any of the fifteenth through twenty-eighth embodiments, wherein the process further comprises the step of curing the rubber.

DETAILED DESCRIPTION OF ILLUSTRATIVE EMBODIMENTS

The present invention provides rubber formulations including a rubber and norbornylized seed oil. Herein, a norbornylized seed oil is a seed oil that is modified with norbornylene groups. In some embodiments, the norbornylene group is inserted into the polymer backbone at positions where the seed oil, prior to modification, included double bonds. It has been found that the norbornylized seed oil can replace the petroleum oils currently often used in rubber formulations.

In some embodiments, the rubber is selected from natural and synthetic rubbers. In some embodiments, the rubber is selected from styrene-butadiene rubber, natural rubber, isoprene rubber, butadiene rubber, butyl rubber, halogenated copolymer of isoprene and isobutylene rubbers, ethylene vinyls acetate copolymer rubber, polyurethane rubber, chlorinated polyethylene rubber, chlorosulfonated polyethylene rubber, acrylic rubber, thermoplastic elastomer rubber, polysulfide rubber, polynorbornene rubber, polychloroprene rubber, silicone rubber, fluoropolymer rubber, nitrile rubber, hydrogenated nitrile rubber, EPDM rubber and other rubbers known in the art.

In some embodiments, the rubber is a blend of synthetic rubbers. In some embodiments, the rubber is a blend of synthetic rubber and natural rubber, or in other embodiments, a blend of synthetic rubber and natural rubber as known in the art.

The seed oil, prior to modification with norbornlyene groups, includes fatty acid chains with carbon-carbon double bonds. The seed oil is modified with norbornylene groups by having at least some of the carbon-carbon double bonds converted into norbornylene groups. The norbornylene group is represented by the following formula (I):

In some embodiments, 3% or more of the carbon-carbon double bonds of the seed oil are converted to norbornylene groups. In other embodiments, 10% or more of the carbon-carbon double bonds of the seed oil are converted to norbornylene groups, in other embodiments, 15% or more, in other embodiments, 25% or more, and in other embodiments, 40% or more.

In some embodiments, 50% or less of the carbon-carbon double bonds of the seed oil are converted to norbornylene groups. In other embodiments, 30% or less of the carbon-carbon bonds of the seed oil are converted to norbornylene groups, in other embodiments, 35% or less, in other embodiments, 40% or less, and in other embodiments, 45% or less.

In some embodiments, from 3% or more to 50% or less of the carbon-carbon double bonds of said seed oil are converted into norbornyl groups. In some embodiments, from 3% or more to 20% or less of the carbon-carbon double bonds are converted, in other embodiments, from 10% or more to 40% or less, in other embodiments, from 15% or more to 35% or less, and in other embodiments from 25% or more to 30% or less.

In some embodiments, the rubber formulation includes 5 parts or more norbornylized seed oil per hundred parts rubber (phr NSO). In other embodiments, the rubber formulation includes 10 or more phr NSO, in other embodiments, 15 or more, and in other embodiments, 20 or more phr NSO.

In some embodiments, the rubber formulation includes from 40 parts or less norbornylized seed oil per hundred parts rubber (phr NSO). In other embodiments, the rubber formulation includes 35 or less phr NSO, in other embodiments, 30 or less, and in other embodiments, 25 or less phr NSO.

In some embodiments, the rubber formulation includes from 5 or more to 40 or less norbornylized seed oil per hundred parts rubber (phr NSO). In some embodiments, from 10 or more to 35 or less norbornylized seed oil phr NSO, in other embodiments, from 10 or more to 30 or less, in other embodiments, from 15 or more to 35 or less, and in other embodiments from 20 or more to 25 or less.

In some embodiments, the seed oil is selected from soybean oil, linseed oil, sunflower oil, safflower oil, palm oil, kernel oil, and the like.

In some embodiments, the seed oil is soybean oil. Soybean oil is a renewable and inexpensive oil resource, containing around 23.4% of oleic, 53.3% of linoleic, 7.8% of linolenic, and around 15% of palmitic and stearic acids. The distribution of the fatty acids may vary from different soybeans and processing methods.

The present invention is directed toward the use of norbornylized seed oils as rubber additions, and is not necessarily directed toward any specific method of creating the norbornylized seed oils. In some embodiments, the norbornylized seed oils are created through the reaction of dicyclopentadiene (DCPD) and a seed oil, converting at least some carbon-carbon double bonds of the seed oil to norbornylene groups. The DCPD dissociates before reacting such that a single DCPD can provide two norbornylene functional groups on the seed oil at two separate locations where there was previously carbon-carbon double bonds.

Figure 1:
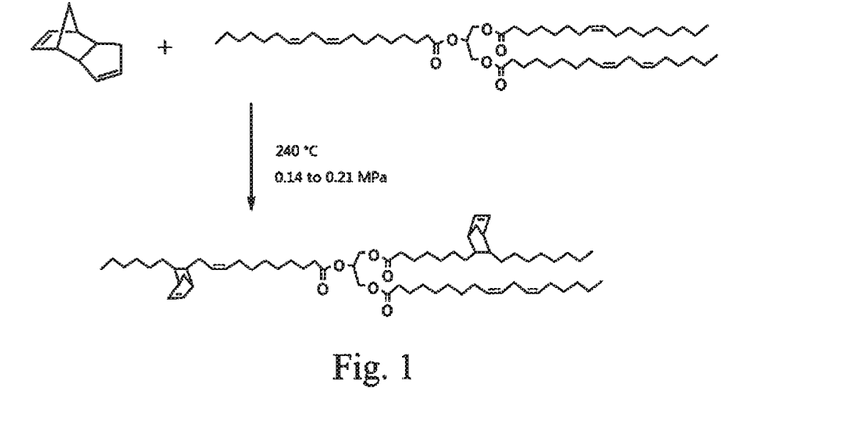
FIG. 1 is a general exemplary reaction scheme showing the reaction between DCPD and soybean oil according to the present invention.

Referring now to FIG. 1, a general exemplary reaction scheme is provided showing the reaction between DCPD and soybean oil.

In some embodiments, soybean oil, DCPD, and an antioxidant, such as butylhydroxytoluene (BHT) can be stirred until all the antioxidant is dissolved. The mixture is then heated, wherein the pressure increases with the increasing temperature. The temperature is maintained until the pressure drops to atmosphere pressure and then the reaction mixture is slowly cooled to room temperature. Solvents such as hexane may be used to dilute the mixture, and the mixture is further filtered. The solvent may be removed with a rotary evaporator at 55-60° C., so as to obtain the product, which might be liquid or highly viscous soft solid. The conversion will be proportional to the ratio of dicyclopentadiene to soybean oil.

In some embodiments, the norbornylized seed oil is created by reacting the seed oil with DCPD with a stoichiometric ratio of dicyclopentadiene to carbon-carbon double bonds of the seed oil is from 1:10 to 5:1. In some embodiments, this stoichiometric ratio is from 2:8 to 4:2, in other embodiments, from 3:6 to 3:2.

The norbornylene groups contain more reactive double bonds than the unmodified double bonds on the fatty acid chains, thus the modified soybean oil is more reactive than the unmodified soybean oil. The reactive double bonds play an important role during the curing of the rubber compound. Soybean oils of various levels of modification are used as extender oils in the SBR to replace the naphthenic oil.

It will be appreciated that the norborylized seed oil may be used in virtually any rubber formulations with and without fillers. The norborylized seed oil may be used in virtually any rubber formulations wherein petroleum oils found application in the past.

It will further be appreciated that, in some embodiments, the rubber formulation can further include fillers of standard type, including carbon black, silica, nanoclays, carbon nanotubes, carbon nanofibers, nanodiamonds, graphene, graphite, and mixtures thereof.

In some embodiments, the rubber formulation includes from 5 parts or more filler per hundred parts rubber (phr filler). In other embodiments, the rubber formulation includes 10 or more phr filler, in other embodiments, 20 or more phr filler, and in other embodiments, 30 or more phr filler, in other embodiments, 40 or more phr filler, and in other embodiments, 45 or more phr filler, and in other embodiments, 50 or more phr filler.

In some embodiments, the rubber formulation includes from 120 parts or less filler per hundred parts rubber (phr filler). In other embodiments, from 100 or less phr filler, in other embodiments, and in other embodiments, from 70 or less, in other embodiments, from 80 or less phr filler, in other embodiments, from 60 or less phr filler, in other embodiments, from 70 or less, in other embodiments, from 55 or less, and in other embodiments, from 60 or less phr filler.

In some embodiments, the rubber formulation includes from 5 to 120 parts filler per hundred parts rubber (phr filler). In other embodiments, from 10 or more to 100 or less phr filler, in other embodiments, from 20 or more to 100 or less, and in other embodiments, from 30 or more to 70 or less, in other embodiments, from 30 or more to 80 or less phr filler, in other embodiments, from 40 or more to 60 or less phr filler, in other embodiments, from 40 or more to 70 or less, in other embodiments, from 45 or more to 55 or less, and in other embodiments, from 50 or more to 60 or less.

In some embodiments, the rubber is styrene butadiene rubber and the norbornylized seed oil is norbornylized soybean oil.

In some embodiments, the rubber is a blend of styrene butadiene rubber with butadiene rubber and other rubber blends known in the art In some embodiments, the rubber is natural rubber, isoprene rubber, butadiene rubber, butyl rubber, halogenated copolymer of isoprene and isobutylene rubbers, ethylene vinyls acetate copolymer rubber, polyurethane rubber, chlorinated polyethylene rubber, chlorosulfonated polyethylene rubber, acrylic rubber, thermoplastic elastomer rubber, polysulfide rubber, polynorbornene rubber, polychloroprene rubber, silicone rubber, fluoropolymer rubber, nitrile rubber, hydrogenated nitrile rubber, EPDM rubber and other rubbers known in the art and the norbornylized seed oil is norbornylized soybean oil.

The rubber formulations can be compounded in conventional manner using conventional equipment as known to those of skill in the art. In some embodiments, the rubber formulation upon compounding of the modified seed oil therein and any desired additional fillers, is cured in an appropriate manner given the rubber and other additions chosen. In some embodiments the rubber formulation is sulfur cured. In some embodiments the rubber formulation include from 2 to 10 phr sulfur.

The norbornylized seed oils of this invention beneficially interact with rubbers and provide significant simultaneous improvements in both the tensile strength and elongation at break of vulcanizates. The rubber formulations of this invention show a significant improvement in the curing time, thermal stability and mechanical performance. In some embodiments, rubber formulation includes from 1 to 6 phr peroxide.

The norbornylized seed oils of this invention beneficially interact with rubbers and provide beneficial changes in tangent loss in various temperature ranges, which is a predictor for improved rolling resistance, wet traction, dry handling, dry traction and snow traction when used in tires.

In light of the foregoing, it should be appreciated that the present invention significantly advances the art by providing a rubber formulation including norbornylized seed oil that can help reduce the need to use carcinogenic petroleum oils. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

EXPERIMENTAL

EXAMPLE 1

Materials

This example is related to manufacture improved rubbers for tires and various rubber goods. In particular, the example is related to replacement of petroleum oils with bio-based oils modified through norbornylization reaction. NSOs are prepared through reaction of dicyclopentadiene and SO with about 30% of the carbon-carbon double bonds converted to norbornylene groups. The use of naphthenic oil (NO), soybean oil (SO) and norbornylene modified soybean oil (NSO) of 30 phr in SBR compounds and vulcanizates prepared with 2 and 3 phr sulfur was evaluated without incorporation of carbon black (CB) and with incorporation of CB at 60 phr. NSOs were prepared through reaction of dicyclopentadiene and SO with about 30% of the carbon-carbon double bonds converted to norbornylene groups. The strategy for the preparation of norbornylized soybean oil (NSO) is shown in FIG. 1.

The NSOs were prepared using stoichiometric ratios of dicyclopendiene (DCPD) to C=C bonds of soybean oil at 13, 25, 150, and 450%. These NSOs were designated as 5NSO, 10NSO, 30NSO, and 45NSO, respectively. Soybean oil (300 g), dicyclopendiene (14, 26, 155, or 466 g) (Table 1), and 4% butylhydroxytoluene (BHT, based on the weight of DCPD) were charged into a flask and stirred completely until all the BHT dissolved. The mixture was converted to a 1000 ml Parr reactor and heated to 240° C. The pressure was increased to certain level with the increasing temperature. The temperature was maintained until the pressure dropped to atmosphere pressure, and then the reaction mixture was slowly cooled to room temperature. Then, hexane was used to dilute the mixture, and the mixture was stirred for 0.5 h. This solution was filtered, and the solvent was removed with a rotary evaporator at 55-60° C. 5NSO, 10NSO, and 30NSO were obtained as light yellow liquid, and 45NSO was a highly viscous soft solid. Table 2 shows the physical data for soybean oil and NSOs.

TABLE 1

Amount of reactants for the norbornylation

|  | Stoichiometric ratio of DCPD/LO (%) | Weight of LO (g) | Weight of DCPD (g) |
| --- | --- | --- | --- |
| 5NSO | 13 | 300 | 14 |
| 10NSO | 25 | 300 | 26 |
| 30NSO | 150 | 300 | 155 |
| 45NSO | 450 | 300 | 466 |

TABLE 2

Physical data for soybean oil and NSOs

|  | Viscosity (Pa s) | $M_n$ | $M_w/M_n$ |
| --- | --- | --- | --- |
| Soybean Oil | 0.053 | 860 | 1.157 |
| 5NSO | 0.100 | 883 | 1.234 |
| 10NSO | 0.340 | 916 | 1.159 |
| 30NSO | 0.460 | 1117 | 1.125 |
| 45NSO | 3.500 | 1232 | 1.133 |

Figure 2:
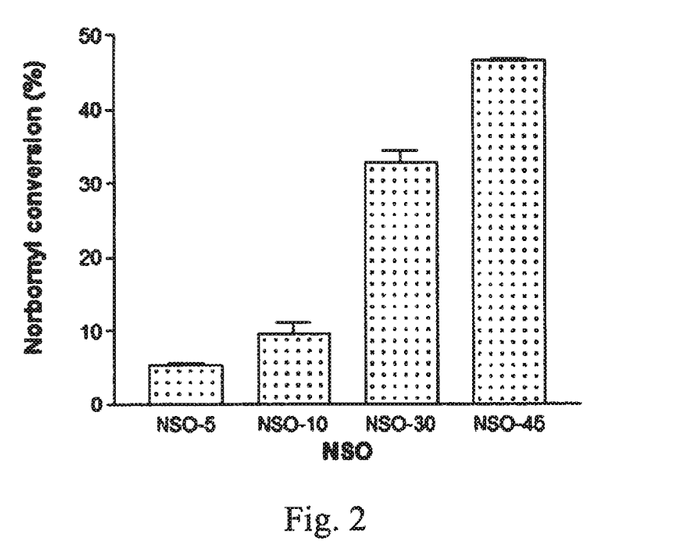
FIG. 2 shows the conversion (norbornylene groups/C=C in soybean oil) of the norbornylized soybean oils according to the present invention.

FIG. 2 shows the conversion (norbornylene groups/C=C in soybean oil) of the norbornylized soybean oils. The conversion is proportional to the ratio of DPCD to soybean oil.

The FT-IR spectra of soybean oil and norbornylized soybean oils showed the a band at 3007 cm$^{-1}$ attributable to the C—H stretching of soybean oil C=C—H. The intensity of the 3007 cm$^{-1}$ band decreased after norbornylation. A new band at 3052 cm$^{-1}$ appeared in the spectra of NSOs. The 3052 cm$^{-1}$ band was attributed to C—H stretching of norbornylene C=C—H.

The intensity of 3052 cm$^{-1}$ band increased and 3007 cm$^{-1}$ band decreased when the amount of DPCD was increased from 14 g to 466 g.

The 1H NMR spectra of soybean oil, 30NSO, and 45NSO showed a resonance at $\delta$=5.34 ppm ($H_9$ and $H_{10}$). In 30NSO and 45NSO, the intensity of this resonance decreased and new resonances at $\delta$=6.08-5.95 ppm ($H_2$ and $H_3$), $\delta$=2.50 ppm ($H_1$ and $H_4$), $\delta$=1.82 ppm ($H_5$ and $H_6$), and $\delta$=1.05-1.20 ppm ($H_{7syn}$ and $H_{7anti}$) were observed. The intensity of the new resonances for 45NSO was much stronger than those of 30NSO. 13C NMR spectra were also produced for soybean oil and 30NSO. For 30NSO and 45NSO, $\delta$=127-133 ppm ($C_9$ and $C_{10}$) decreased, and new resonances at $\delta$=135-138 ppm ($C_2$ and $C_3$) were observed.

The ESI-MS spectra of soybean oil and 30NSO, and the spectrum of soybean oil showed peaks at 900, 902, 904, 906, and 908 Da, which were attributed to soybean oil Na$^+$ having 5, 4, 3, 2, and 1 double bonds, respectively. When norbornylene was reacted with the soybean oil, the resultant products formed a distribution of masses. This is due to soybean oil molecules of varying degree of unsaturation that add from zero to four norbornylene groups. For example, a sodiated soybean oil molecule with four unsaturations (double bonds) has a molecular formula of $C_{57}H_{100}O_6Na$, which has a nominal mass of 902 Da. When the sodiated soybean oil molecules at 902 Da add one, two, three, or four norbornylene groups, the resultant functionalized oils displayed mass peaks at m/z=968, 1034, 1100, and 1166, respectively. No molecules higher than 1166 Da were detected, which indicated that the amount of soybean oil that has more than 4 norbornylene groups was minimal.

A solution polymerized SBR of grade EB091/HX739 manufactured by Firestone Tire and Rubber Company (Akron, Ohio) was used. Carbon black N330 manufactured by Sid Richardson (Fort Worth, Tex.) was used as a filler. Naphthenic oil under the tradename Plasticizer LN by Akrochem Corporation (Akron, Ohio) was used as a petroleum extender oil. A technical grade RBD soybean oil manufactured by Cargill Industrial Oils & Lubricants (Minneapolis, Minn.) was used as a replacement for naphthenic oil. In addition, the above-mentioned modified soybean oils were used including 5NSO, 10NSO, 30NSO and 45NSO. In these modified soybean oils, about 5%, 10%, 30% and 45% of the carbon-carbon double bonds of the original soybean oil were converted to norbornylene groups. The double bonds in the norbornylene groups are more reactive compared to those in the unmodified soybean oil.

Rubber compounding ingredients were zinc oxide (ZnO), N-octadecanoic acid (stearic acid), sulfur, and accelerator N-cyclohexyl-2-benzothiazole sulfenamide (CBTS). These ingredients were provided by Akrochem Corporation (Akron, Ohio).

mixer (1.2 L Model 86EM9804, Banbury USM Corp., Ansonia, Conn.). A rotor speed of 60 rpm, a fill factor of 0.7, and a setup temperature with cooling water of 50° C. was used. First, SBR gum was placed in the Banbury mixer for 120 s, ½ of extender oil was added, and mixed for another 120 s. Then the other ½ of oil was added, and mixed for 180 s, with total time of mixing being 420 s.

Naphthenic oil-extended SBR (SBR/NO), soybean oil-extended SBR (SBR/SO) and various modified soybean oil-extended SBR (SBR/NSO) from the Banbury mixer were then mixed with 60 phr of carbon black (CB), 5 phr of ZnO and 1 phr of stearic acid using a Brabender mixer manufactured by C.W Brabender Instruments, INC (80 mL, Model Plasti-corder, So. Hackensack, N.J.). A rotor speed of 55 rpm, and a setup temperature of 80° C. for SBR/NO, SBR/SO, SBR/5NSO, SBR/10NSO, SBR/30NSO and SBR/45NSO compounds were used. First, the rubber was mixed for 90 s, the ZnO and stearic acid was added. At 120 s, the carbon black was added, and then mixed for 240 s, with total mixing time being 360 s. Sulfur and accelerator CBTS were then mixed with rubber on a two roll mill (Dependable Rubber Machinery Co., Cleveland, Ohio) for about 6 minutes. A rotor speed of 20 rpm and a cooling water temperature of 40° C. was used. Table 3 provides the recipes of the prepared compounds with SBR/NO and SBR/SO being control compounds.

TABLE 3

Compounding recipes and properties of SBR vulcanizates

| Sample | SBR/NO (phr) | SBR/SO (phr) | SBR/5NSO1 (phr) | SBR/10NSO1 (phr) | SBR/30NSO1 (phr) | SBR/45NSO-1 (phr) | SBR/5NSO-2 (phr) | SBR/10NSO-2 (phr) | SBR/30NSO-2 (phr) |
|---|---|---|---|---|---|---|---|---|---|
| SBR | 100 | 100 | 100 | 100 | 100 | 100 | 100 | 100 | 100 |
| NO | 30 | | | | | | | | |
| SO | | 30 | | | | | | | |
| 5NSO | | | 30 | | | | 30 | | |
| 10NSO | | | | 30 | | | | 30 | |
| 30NSO | | | | | 30 | | | | 30 |
| 45NSO | | | | | | 30 | | | |
| ZnO | 5 | 5 | 5 | 5 | 5 | 5 | 5 | 5 | 5 |
| Stearic Acid | 1 | 1 | 1 | 1 | 1 | 1 | 1 | 1 | 1 |
| Sulfur | 2 | 2 | 2 | 2 | 2 | 2 | 3 | 3 | 3 |
| Accelerator (CBTS) | 1.3 | 1.3 | 1.3 | 1.3 | 1.3 | 1.3 | 1.95 | 1.95 | 1.3 |
| CB | 60 | 60 | 60 | 60 | 60 | 60 | 60 | 60 | 60 |
| Total | 199.3 | 199.3 | 199.3 | 199.3 | 199.3 | 199.3 | 200.95 | 200.95 | 200.3 |
| $T_{95}$ Unfilled (min) | 37.5 | 45.3 | 23.5 | 27.2 | 28.3 | 31.1 | 22.0 | 22.2 | 24.4 |
| M100 (MPa) | 0.489 | 0.446 | 0.443 | 0.407 | 0.390 | 0.398 | 0.515 | 0.510 | 0.425 |
| M300 (MPa) | 0.961 | 0.699 | 0.691 | 0.597 | 0.531 | 0.522 | 0.949 | 0.903 | 0.645 |
| $\varepsilon_b$ (%) | 326.3 | 402.5 | 477.2 | 489.6 | 674.5 | 744.9 | 363.1 | 392.9 | 623.7 |
| $\sigma_b$ (MPa) | 0.933 | 0.902 | 0.967 | 0.912 | 1.021 | 1.091 | 1.139 | 1.158 | 1.357 |
| Hardness (Shore A) | 28 | 26 | 27 | 27 | 28 | 29 | 29 | 29 | 30 |
| $T_{95}$ CB-filled (min) | 18.2 | 25.2 | 14.4 | 11.5 | 12.8 | 13.0 | 7.6 | 7.6 | 11.3 |
| M100 (MPa) | 2.74 | 2.22 | 1.41 | 1.28 | 1.23 | 1.19 | 2.03 | 2.19 | 1.51 |
| M300 (MPa) | 12.36 | 9.87 | 5.48 | 4.51 | 3.42 | 3.03 | 9.10 | 8.63 | 5.41 |
| $\varepsilon_b$ (%) | 321.3 | 427.3 | 671.8 | 755.2 | 943.0 | 776.1 | 512.5 | 560.0 | 772.8 |
| $\sigma_b$ (MPa) | 13.57 | 15.76 | 17.08 | 16.56 | 13.05 | 10.065 | 18.63 | 19.27 | 18.51 |
| Hardness (Shore A) | 65 | 61 | 58 | 58 | 61 | 63 | 60 | 61 | 62 |
| Abrasion Loss (g) | 0.142 | 0.129 | 0.144 | 0.172 | 0.199 | 0.239 | 0.134 | 0.148 | 0.162 |

Compounding

Different recipes of SBR compounds were utilized. SBR was mixed with 30 phr of naphthenic oil (NO), soybean oil (SO), 5NSO, 10NSO, 30NSO and 45NSO using a Banbury Vulcanization After the compounding of various CB-filled SBR samples, the curing curves were measured by the Advanced Polymer Analyzer (APA2000, Alpha Technologies, Akron, Ohio) at a temperature of 160° C., a frequency of 1.67 Hz, and a strain amplitude of 4.2%. A curing time T95 (time to 95% cure) was calculated based on curing curves. The samples for tensile and abrasion tests were prepared using an electrically heated a compression molding press (Carver, Wabash, Ind.) under the temperature of 160° C. and a pressure of 15 MPa for time T95. Compounds and vulcanizates containing SBR/NO and SBR/SO were used as the control samples. Compounds and vulcanizates containing SBR/NSO were used as products of the present invention.
Characterization
1. Measurement of Thermal Properties Thermal properties were measured by TA Instruments Differential Scanning calorimeter Q2000 (DSC). DSC curves of various SBR gums and their unfilled and CB-filled vulcanizates were obtained under $N_2$ atmosphere. The experiments were in a temperature ranged from −90° C. to 50° C. for all the samples. The sample weight used was from 3 to 6 mg. The sample was heated up to erase the thermal history. Then it was cooled down to −90° C. of a cooling rate of 10° C./min, and heated up to 50° C. of a heating rate of 10° C./min. The second heating curves were selected to report the thermal properties.

2. Measurement of Mechanical Properties

For tensile tests, the CB-filled SBR compounds were compression molded, and vulcanized into slabs of dimension of 150 mm×150 mm and a thickness range of 1.5-2.5 mm. Dumbbell shape specimens (ASTM D412, ISO type 1) used in the stress-strain tests were cut from the vulcanized slabs. The test was done at room temperature using an Instron tensile tester (Model 5567, Instron, Canton, Mass.) at a crosshead speed of 500 mm/min. An extensometer was used. At least five specimens were used for each vulcanizate.

Hardness tests were done using a Durometer type A according to ASTM 2240.

CB-filled SBR compounds were compression molded and vulcanized into cylinder samples for the abrasion tests. Samples of a diameter of 16 mm and a length of 12 mm were prepared. At least four specimens of each vulcanizate were used in the test. The abrasion test was done using a Deutsches Institut für Normung Abrader (Zwick Abrasion Tester 6102) according to DIN 53516. A load of 10 N was given to the specimens without specimen rotation. A pathway of 40 m was applied to the CB-filled SBR vulcanizates.

3. Gel Fraction and Crosslink Density

The gel fraction of the unfilled and CB filled vulcanized samples were measured. The Soxhlet extraction method was employed with benzene as a solvent. A Kimax extraction set (Fisher Co.) was used. Samples of 0.5 to 1.0 g were put into a Whatman cellulose extraction thimble in the Soxhlet extractor, the whole apparatus was heated on a heater. After an extraction time of 24 hours, the weights of the swollen samples were measured. Then the samples were dried in an oven at 65° C. for 24 hours and the weights of dry rubber samples were measured. The gel fraction was determined.

Crosslink density of the SBR and CB-filled SBR vulcanizates were calculated using the Flory-Rehner equation. The Kraus correction factor was used to calculate the crosslink density of the CB-filled SBR.

Benzene has a value of the molar volume of $V1=88.838$ cm^3/mole and its density is 0.874 g/mL. The density of the SBR is 0.93 g/cm^3 and an interaction parameter ($\chi$) of 0.4 was used for SBR and benzene. A Kraus correction factor of 1.17 was used for the carbon black N330.

Discussion

The SBR compounds and vulcanizates containing 30 phr of naphthenic oil (NO), soybean oil (SO) and modified soybean oil (NSO) of various extents were prepared with and without the incorporation of 60 phr carbon black (CB). NSOs of four different extents of modification including 5% (5NSO), 10% (10NSO), 30% (30NSO) and 45% (45NSO) were prepared.

The NSO-extended SBR compounds showed a lower discharge temperature and power consumption in the internal mixer than the SBR compounds without any processing oils (Table 4). The NSO-extended SBR compounds showed a slightly increased discharge temperature and power consumption in comparison with the SO-extended SBR compounds. These effects were due to an increase of the viscosity of NSO with the increase of the extent of modification. The curing times of various CB-filled SBR/MSO compounds were shorter than those of the CB-filled SBR/NO and SBR/SO (Table 3). All the NSO extended SBR exhibited a lower Tg than the SO extended SBR gums and vulcanizates (Table 5). The SBR gums, unfilled and CB-filled SBR vulcanizates showed the following ranking in Tg: SBR/SO<SBR/5NSO<SBR/10NSO<SBR/NO<SBR/30NSO<SBR/45NSO<SBR. TGA studies indicated that various CB-filled SBR/NSO vulcanizates exhibited a better thermal stability compared to the CB-filled SBR/NO vulcanizates. The crosslink densities of various CB-filled SBR/NSO vulcanizates were all lower than that of the CB-filled SBR/SO showing a tendency to gradually decrease with an increase of the extent of modification (Table 6).

TABLE 4

Processing data from Banbury mixer (initial temperature of 50° C.)

| | Discharge Temperature (° C.) | Power Consumption (KW) |
|---|---|---|
| SBR/NO Gum | 83 | 10.0 |
| SBR/SO Gum | 78 | 9.0 |
| SBR/5NSO Gum | 78 | 10.0 |
| SBR/10NSO Gum | 79 | 11.0 |
| SBR/30NSO Gum | 80 | 11.0 |
| SBR/45NSO Gum | 85 | 11.5 |

TABLE 5

Tg of SBR gums, unfilled and CB-filled SBR vulcanizates

| | Tg of SBR Gums (° C.) | Tg of SBR Unfilled Vulcanizates (° C.) | Tg of SBR CB-filled Vulcanizates (° C.) |
|---|---|---|---|
| SBR/NO | −45.4 | −41.2 | −38.8 |
| SBR/SO | −54.1 | −46.8 | −42.3 |
| SBR/5NSO-1 | −49.6 | −43.9 | −41.2 |
| SBR/10NSO-1 | −46.7 | −43.5 | −40.5 |
| SBR/30NSO-1 | −43.5 | −37.6 | −37.7 |
| SBR/45NSO-1 | −39.0 | −34.2 | −33.8 |
| SBR/5NSO-2 | −49.6 | −42.4 | −40.4 |
| SBR/10NSO-2 | −46.7 | −41.6 | −39.9 |
| SBR/30NSO-2 | −43.5 | −35.6 | −35.4 |

TABLE 6

Gel fraction and crosslink density of unfilled and CB-filled SBR vulcanizates

|  | Unfilled SBR Gel Fraction (%) | Unfilled SBR Crosslink Density (Kmol/m$^3$) | CB-Filled SBR Gel Fraction (%) | CB-Filled SBR Crosslink Density (Kmol/m$^3$) |
|---|---|---|---|---|
| SBR/NO | 79.2 | 0.0856 | 84.9 | 0.1170 |
| SBR/SBO | 79.3 | 0.0529 | 84.8 | 0.0654 |
| SBR/5NSO-1 | 79.4 | 0.0520 | 84.9 | 0.0503 |
| SBR/10NSO-1 | 79.6 | 0.0481 | 84.9 | 0.0415 |
| SBR/30NSO-1 | 79.6 | 0.0393 | 84.8 | 0.0270 |
| SBR/45NSO | 79.7 | 0.0328 | 84.9 | 0.0239 |
| SBR/5NSO-2 | 80.0 | 0.0854 | 85.5 | 0.0919 |
| SBR/10NSO-2 | 80.1 | 0.0804 | 85.3 | 0.0882 |
| SBR/30NSO-2 | 79.6 | 0.0523 | 85.3 | 0.0429 |

The mechanical properties of all the CB-filled SBR vulcanizates were evaluated. These data are shown in Table 3. The moduli at 100% elongation were found to decrease and correlated well with their crosslink densities. The CB-filled SBR/5NSO and SBR/10NSO vulcanizates unexpectedly showed a significant increase in the tensile strength and elongation at break. The highest value of the elongation at break was achieved in the CB-filled SBR/30NSO vulcanizate exhibiting approximately three times increase in the elongation at break in comparison with that of the control CB-filled SBR/NO vulcanizate while maintaining the tensile strength. Among various oil-extended SBR vulcanizates with the same recipe the CB-filled SBR/5NSO of the present invention exhibited the highest strength with its value being 26% higher than the control CB-filled SBR/NO vulcanizate. At the same time, its elongation to break was more than two times higher than that of the control vulcanizate. Such unexpected synergistic changes in the properties was not achieved earlier.

In order to increase the modulus at 100% elongation of SBR/NSO vulcanizates the sulfur/accelerator content in recipe was increased from 2 phr/1.3 phr to 3 phr/1.95 phr for the CB-filled SBR/5NSO and CB-filled SBR/10NSO. The vulcanizates of the CB-filled SBR/10NSO exhibited the modulus close to that of the CB-filled SBR/SO, but still lower than that of the CB-filled SBR/NO vulcanizates. However, the strength and elongation at break of the CB-filled SBR/10NSO vulcanizates of the present invention were, respectively, by 42% and 74% higher than that of the control CB-filled SBR/NO vulcanizate with the same recipe. The hardness of the CB-filled SBR/NSO vulcanizates slightly increased with the extent of modification, probably due to the presence of DPCD in the vulcanizates. Abrasion resistance of various CB-filled SBR/NSO vulcanizates decreased with the extent of modification. However, after increasing the content of curatives in the CB-filled SBR/5NSO vulcanizate of the present invention, the abrasion resistance of their vulcanizates increased and become similar to that of the CB-filled SBR/SO vulcanizates and better than the control CB-filled SBR/NO vulcanizates.

Finally, it should be noted that the CB-filled SBR/NSO compounds and vulcanizates unexpectedly exhibited a significant improvement in the curing time, thermal stability and mechanical performance. With an appropriate adjustment of their compounding recipe, well known in the art, a great potential exists to replace the petroleum extender oils by norbornylene modified soybean oils in the rubber formulation.

EXAMPLE 2

Materials

A solution polymerized SBR named EB091/HX739 manufactured by Firestone Polymers (Akron, Ohio) was used. It is tin coupled, and has 20% bound styrene, 60% vinyl, and a non-staining antioxidant stabilizer system. Carbon black N330 from Sid Richardson (Fort Worth, Tex.) was used as a filler. Its Brunauer-Emmet-Teller (BET) surface area was 78 m$^2$/g and dibutyl-phthalate absorption was 102 mL/100 g. The rubber compounding ingredients used were zinc oxide (ZnO) under the trade name of Zinc Oxide RGT-M, N-octadecanoic acid (stearic acid) under the trade name of Stearic Acid Rubber Grade, sulfur under the trade name of Rubber Maker (RM) Sulfur, and accelerator N-cyclohexyl-2-benzothiazole sulfenamide (CBTS). These ingredients were provided by Akrochem Corporation (Akron, Ohio). Naphthenic oil under the trade name Plasticizer LN by Akrochem Corporation (Akron, Ohio) was used as a petroleum extender oil. It is a hydro-treated naphthenic rubber process oil. A technical grade RBD soybean oil by Cargill Industrial Oils & Lubricants (Minneapolis, Minn.) was used.

Modification of Soybean Oil

Modified soybean oil (MSO) of different modification levels were used. The MSOs were prepared through the reaction of various ratios of dicyclopentadiene (DCPD) to soybean oil. About 5%, 11%, 33% and 47% of the C=C bonds in the modified soybean oil were converted into norbornylene groups and named as 5MSO, 11MSO, 33MSO and 47MSO, respectively. The double bonds in the norbornylene groups are more reactive compared to those in the unmodified fatty acid chains. The strategy of the preparation of MSO is shown in FIG. 1.

Soybean oil (300 g), DCPD (14, 26, 155, or 466 g), and 4% BHT (based on the weight of DCPD) were charged into a flask and stirred until all the BHT dissolved. The mixture were then transferred to a 1000 ml Parr reactor and heated to 240° C. The pressure increased with the increasing temperature and reached a stable value between 0.14 to 0.21 MPa. The temperature was maintained until the pressure dropped to atmosphere pressure, and then the reaction mixture was slowly cooled to room temperature. Hexane was used to dilute the mixture, and the mixture was stirred for 0.5 h. This solution was filtered, and the solvent was removed with a rotary evaporator at 55-60° C. 5MSO, 11MSO and 33MSO were obtained as light yellow liquid, and 47MSO was a highly viscous soft solid. FIG. 1 shows the conversion (norbornylene groups to carbon double bonds in soybean oil) of the MSOs. The conversion is proportional to the ratio of dicyclopentadiene to soybean oil.

GPC instrument was used to determine molecular weight and polydispersity index (PDI) of SO and various MSOs. Tetrahydrofuran (THF) was used as a solvent, GPC was equipped with a Waters 1515 isocratic pump, Waters Styragel columns and a Waters 2414 refractive index (RI) detector. The columns were calibrated with narrow distribution polystyrene (PS) standards. Fourier transform infrared (FT-IR) spectroscopy was performed for SO and various MSOs using a FT-IR spectrometer (Nicolet 380, Thermo Scientific, MA) by casting thin liquid film onto KBr crystal. Data spacing of 4 cm-1 and resolution of 32 were used. 1H NMR and 13C NMR spectra of SO and 33MSO were recorded on a NME spectrometer (INOVA 300 MHz, Varian, Calif.) using chloroform-d as a solvent. Mass spectrometry experiments were performed for SO and 33MSO with a Bruker Esquire-LC ion-trap mass spectrometer equipped with an electrospray ionization (ESI) source (Billerica, Mass.).

Compounding and Curing

Different recipes of SBR compounds were made, as listed in Table 7. SBR was mixed with 30 phr of naphthenic oil (NO), soybean oil (SO), 5MSO, 11MSO, 33MSO and 47MSO using a Banbury mixer (1.2 L Model 86EM9804, Banbury USM Corp., Ansonia, Conn.). A rotor speed of 60 rpm, a fill factor of 0.7, and setup temperature with cooling water of 50° C. were used. Various oil-extended SBR gums from the Banbury mixer were then mixed with 60 phr of carbon black (CB), 5 phr of ZnO and 1 phr of stearic acid using a Brabender mixer manufactured by C.W Brabender Instruments, Inc. (80 mL, Model Plasti-corder, So. Hackensack, N.J.). A rotor speed of 55 rpm, and a setup temperature of 80° C. were used. Then 2 phr of Sulfur and 1.3 phr of accelerator CBTS were mixed with rubber on a two roll mill (Dependable Rubber Machinery Co., Cleveland, Ohio) for about 5-6 minutes. A rotor speed of 20 rpm, a gap size of 6 mm and a cooling water temperature of 40° C. were used. In addition to the original recipe which contained 2 phr of sulfur and 1.3 phr of accelerator, the SBR/5MSO and SSR/11MSO compounds with 3 phr of sulfur and 1.95 phr of accelerator were also prepared and named as SBR/5MSO-2 and SBR/11MSO-2. Compounding procedures and parameters were kept the same. The compounding procedure of the first two steps is shown in Table 8.

slabs with a dimension of 150 mm×150 mm and a thickness range of 1.7-2.2 mm for tensile test, and cylindrical samples with a diameter of 16 mm and a length of 12 mm for abrasion test were prepared using an electrically heated compression-molding press (Carver, Wabash, Ind.) under the temperature of 160° C. and a pressure of 15 MPa.

Characterization

Gel fraction, crosslink density of various SBR vulcanizates, and the bound rubber fraction of various SBR compounds were measured using the swelling test. The Soxhlet extraction method was employed with benzene as the solvent. For SBR vulcanizates, samples of 0.5 to 0.9 g were put into a Whatman cellulose extraction thimble in the Soxhlet extractor and the whole apparatus was heated on a heater. After an extraction time of 24 hours, the weights of the swollen samples were measured. Then the samples were dried in a vacuum oven at 65° C. for 24 hours, the weights of dry rubber were measured. The gel fraction was determined by the final weight of dry rubber over the initial weight of the sample. Crosslink density of SBR vulcanizates were calculated using the Flory-Rehner equation 19 and the Kraus correction 20. The bound rubber fraction of SBR compounds was also calculated by extraction and drying using the same condition as described above.

Rheological properties of various SBR compounds and vulcanizates were measured by the Advanced Polymer Analyzer (APA2000, Alpha Technologies, Akron, Ohio). A

TABLE 7

Compounding Recipe

| | SBR/ NO (phr) | SBR/ SO (phr) | SBR/ 5MSO (phr) | SBR/ 11MSO (phr) | SBR/ 33MSO (phr) | SBR/ 47MSO (phr) | SBR/ 5MSO-2 (phr) | SBR/ 11MSO-2 (phr) |
|---|---|---|---|---|---|---|---|---|
| SBR | 100 | 100 | 100 | 100 | 100 | 100 | 100 | 100 |
| NO | 30 | | | | | | | |
| SO | | 30 | | | | | | |
| 5MSO | | | 30 | | | | 30 | |
| 11MSO | | | | 30 | | | | 30 |
| 33MSO | | | | | 30 | | | |
| 47MSO | | | | | | 30 | | |
| ZnO | 5 | 5 | 5 | 5 | 5 | 5 | 5 | 5 |
| Stearic Acid | 1 | 1 | 1 | 1 | 1 | 1 | 1 | 1 |
| Sulfur | 2 | 2 | 2 | 2 | 2 | 2 | 3 | 3 |
| Accelerator (CBTS) | 1.3 | 1.3 | 1.3 | 1.3 | 1.3 | 1.3 | 1.95 | 1.95 |
| CB | 60 | 60 | 60 | 60 | 60 | 60 | 60 | 60 |
| Total | 199.3 | 199.3 | 199.3 | 199.3 | 199.3 | 199.3 | 200.95 | 200.95 |

TABLE 8

Compounding Procedure

| Banbury | | Brabender | |
|---|---|---|---|
| Time (min. sec) | Action | Time (min. sec) | Action |
| 0.00 | Add rubber | 0.00 | Add rubber |
| 2.00 | Add ½ oil | 1.30 | Add ZnO and stearic acid |
| 4.00 | Add ½ oil | 2.00 | Add CB |
| 6.00 | Dump | 6.00 | Dump |

The curing curves SBR compounds were measured by the Advanced Polymer Analyzer (APA2000, Alpha Technologies, Akron, Ohio) at a temperature of 160° C., a frequency of 10.5 rad/s and a strain amplitude of 4.2%. A curing time T95 was calculated based on curing curves. The vulcanizate frequency sweep test was applied in a frequency range from 0.02-200 rad/s (logarithmic mode) at a strain amplitude of 4.2% and a temperature of 90° C. The frequency dependence of the storage (G'), loss (G") moduli, tan δ and complex viscosity of SBR compounds and vulcanizates were measured. The dependence of the dynamic properties of various SBR compounds and vulcanizates on the strain amplitude at a frequency of 0.6 rad/s were also measured using APA 2000 at 90° C. In particular, a strain amplitude range from 0.3% to 200% was used for compound and 0.3% to 50% were used for vulcanizates, respectively.

To study the reaction between SO and MSO with curatives, SO, 11MSO and 33MSO were mixed with curatives and heated at 160° C. to simulate the condition in rubber matrix. First, 10 g of oils were mixed with 0.667 g of sulfur, 0.433 g of CBTS, 1.667 g of ZnO and 0.333 g of stearic acid, then the mixtures were placed in vacuum oven preheated to 160° C. and vacuumed to avoid thermal degradation. After heating at 160° C. for 60 min, the mixtures were taken out and cooled down at room temperature for 24 hours. Steady-state shear viscosity of SO, 11MSO, 33MSO and SO/curatives, 11MSO/curatives and 33MSO/curatives after the heating were measured by a Discovery Hybrid Rheometer (DHR-2, TA Instruments, New Castle, Del.) equipped with a 25 mm cone and plate fixtures with cone angle of 2o. The mixture of oils and curatives were first centrifuged at 3500 rpm for 5 min to remove the undissolved residue. And then the steady-state shear viscosity of the oil as a function of shear rate ranged from 5 s-1 to 100 s-1 was measured at a temperature of 35° C.

Thermal properties of various extender oils, SBR compounds and vulcanizates were measured by Differential Scanning calorimeter (DSC Q200, TA Instruments, New Castle, Del.) and Thermogravimetric Analysis (TGA Q50, TA Instruments, New Castle, Del.). DSC curves of various extender oils, SBR compounds, and SBR vulcanizates were obtained under nitrogen atmosphere. The experiments were conducted in a temperature range from −90° C. to 50° C. for all the samples. To erase the thermal history, the samples were first heated up to 80° C. and kept at this temperature for 5 minutes. Then the samples were cooled down to −90° C. at a cooling rate of 10° C./min, finally the samples were heated up to 50° C. at a heating rate of 10° C./min. The second heating curves were selected to report the thermal properties. In addition, the mixture of oil/curatives was placed in DSC and heated up to 160° C. and kept for 10 min. The data in the isothermal step were used to characterize the reaction. TGA curves were also obtained under nitrogen atmosphere. The temperature was increased from room temperature to 600° C. at a heating rate of 20° C./min.

To study the mechanical properties of various SBR vulcanizates, tensile, hardness and abrasion tests were conducted. Dumb-bell shape specimens (ASTM D412, ISO type 1) for tensile test were cut from the vulcanized slabs. The tensile tests were done at room temperature using an Instron tensile tester (Model 5567, Instron, Canton, Mass.) at a crosshead speed of 500 mm/min. An extensometer was used and at least five specimens were used for each type of vulcanizate. Hardness tests for various SBR vulcanizates were done at room temperature using a Durometer type A according to ASTM 2240. The abrasion test was done using a Deutsches Institut für Normung Abrader (Zwick Abrasion Tester 6102) according to DIN 53516. A load of 10 N was given to the specimens without specimen rotation. A pathway of 40 m was applied to various SBR vulcanizates. The weight loss of the sample was used to characterize the abrasion resistance. At least four specimens of each vulcanizate were used in the test.

The dynamic mechanical properties of SBR vulcanizates were evaluated using a Dynamic Mechanical Analysis (DMA Q800, TA Instruments, New Castle, Del.), at a frequency of 1 Hz, a strain amplitude of 0.5% and in tensile mode. The storage (E'), loss (E") moduli and tan δ of various SBR vulcanizates were obtained using a temperature sweep from −90° C. to 90° C., at a heating rate of 3° C./min. The values of tan δ and storage modulus at different temperatures were used as a predictor of the performance of the rubber in tires.

Results and Discussion
1. Characterization of MSO

Table 9 shows the molecular weight and PDI index for SO and various MSOs. It is observed that with an increase of modification level, the molecular weight of various MSOs is increased, and the PDI index remains practically unchanged. FT-IR spectra of SO and various MSOs showed the band at 3007 cm-1 is attributed to the C—H stretching of the C=C—H groups in the SO molecule. The intensity of the 3007 cm-1 band decreases after the modification. A new band at 3052 cm-1 appears in the spectra of MSOs which is attributed to C—H stretching of norbornylene C=C—H groups. It is also seen that the intensity of 3052 cm-1 band increases and 3007 cm-1 band decreases with an increase of the modification level.

TABLE 9

Molecular weight and polydispersity of SO and MSO

| | $M_n$ | $M_w/M_n$ |
|---|---|---|
| SO | 860 | 1.157 |
| 5MSO | 883 | 1.234 |
| 11MSO | 916 | 1.159 |
| 33MSO | 1117 | 1.125 |
| 47MSO | 1232 | 1.133 |

A comparison of the 1H NMR spectra of SO and 33MSO showed a resonance at δ=5.34 ppm ($H_9$ and $H_{10}$) for soybean oil. In 33MSO, the intensity of this resonance was decreased and new resonances at δ=6.08-5.95 ppm ($H_2$ and $H_3$), δ=2.50 ppm ($H_1$ and $H_4$), δ=1.82 ppm ($H_5$ and $H_6$), and δ=1.05-1.20 ppm ($H_{7syn}$ and $H_{7anti}$) were observed. 13C NMR spectra of SO and 33MSO showed a decrease in resonance at δ=127-133 ppm ($C_9$ and $C_{10}$) and new resonances at δ=135-138 ppm ($C_2$ and $C_3$) as compared to SO.

An ESI-MS spectra of SO and 33MSO showed the spectrum of SO with peaks at 900, 902, 904, 906, and 908 Da, which were attributed to sodiated SO ([SO] Na$^+$) that have 5, 4, 3, 2, and 1 double bonds, respectively. When norbornylene groups were added to the SO, the resultant products formed a distribution of masses due to SO molecules of varying degree of unsaturation that add from zero to four norbornylene groups. For example, a sodiated SO molecule with four unsaturations (double bonds) has a molecular formula of $C_{57}H_{100}O_6Na$, which has a nominal mass of 902 Da. When the sodiated SO molecules at 902 Da added one, two, three, or four norbornylene groups, the resultant functionalized oils displayed mass peaks at m/z=968, 1034, 1100, and 1166, respectively. No molecules higher than 1166 Da were detected, indicating that the amount of SO that has more than 4 norbornylene groups is minimal.

2. Swelling Test

The SBR/SO vulcanizate had a gel fraction of 84.9%, which was slightly higher than that of the SBR/NO vulcanizate with its value being 84.8%. With an increase of the modification level, the gel fraction of the SBR/MSO vulcanizates was slightly increased. The slight increase of gel fraction of SBR/SO and various SBR/MSO vulcanizates in comparison with SBR/NO vulcanizate was probably due to the covulcanization of the SO and MSOs with rubber. After increasing the amount of sulfur and CBTS in the recipe, the gel fraction of the SBR/5MSO-2 and SBR/11MSO-2 increased to 85.5% and 85.3%, respectively, which was higher compared to those of the vulcanizates with original recipe.

The crosslink density of SBR/NO and SBR/SO vulcanizate is 0.117 Kmol/m$^3$ and 0.065 Kmol/m$^3$, respectively. The SBR/5MSO, SBR/11MSO, SBR/33MSO and SBR/47MSO vulcanizates exhibited a crosslink density of 0.050 Kmol/m$^3$, 0.042 Kmol/m$^3$, 0.027 Kmol/m$^3$ and 0.024 Kmol/m$^3$, respectively. It was shown that the SBR/SO and all the SBR/MSO vulcanizates exhibited a lower crosslink density compared to that of the SBR/NO vulcanizate. It was very likely that the SO and MSO reacted with curatives and thus consumed certain amounts of sulfur, therefore causing the drop in the crosslink density of the SBR vulcanizates. After increasing the curative content, the crosslink density of the SBR/5MSO-2 and SBR/11MSO-2 was increased to 0.092 Kmol/m$^3$ and 0.088 Kmol/m$^3$, respectively, but was still lower than that of SBR/NO vulcanizate.

The SBR/NO and SBR/SO compounds had a bound rubber fraction of 23.5% and 25.5%, respectively. The bound rubber fraction of the SBR/5MSO, SBR/11MSO, SBR/33MSO and SBR/47MSO compounds was 25.1%, 21.5%, 18.7% and 16.8%, respectively. It was observed that the SBR/SO and SBR/5MSO compounds exhibited a higher bound rubber fraction than that of the SBR/NO compound. With the increase of the modification level, the bound rubber fraction of the SBR/MSO compounds decreased. The increase of bound rubber fraction of the SBR/SO compound compared to the SBR/NO compound was probably due to the microplasticization effect and the coupling effect of the SO with SBR and CB. The ester groups of the oils interact with the surface of the CB and the fatty acid chains blend with the SBR chains. These effects enhanced the interaction between the rubber and the CB, and therefore improve abrasion resistance. After further modification, the coupling effect was weakened due to an increase of number of norbornylene side groups leading to a decrease of the bound rubber fraction.

3. Rheological Properties

Frequency dependences of the G'(kPa), G" (kPa), tan δ, and complex viscosity (Pa×s) of various SBR compounds showed that G' of compounds increased with the frequency and G" shows a maximum at an intermediate frequency. The SBR/SO compound showed the lowest values of G' and G". The SBR/MSO compounds exhibited an increasing value of G' and G" with an increase of the modification level. The SBR/NO compounds exhibited similar values of G' and G" as the SBR/5MSO and SBR/11MSO compounds. The SBR/33MSO and SBR/47MSO compounds showed similar values of G' and G" but higher than those of the SBR/5MSO and SBR/11MSO compounds. The SBR/SO compound exhibited the highest value of tan δ. With the increase of the modification level, the tan δ value of SBR/MSO compounds was decreased. The SBR/NO compound exhibited the lowest tan δ value among all the compounds. It was observed that all the compounds exhibited a plateau in tan δ in the frequency range from 0.02 to 0.43 rad/s and at higher frequency tan δ value decreased. This plateau was attributed to the relaxation of long-chain branches in this particular star-shaped SBR. The complex viscosity of various compounds indicated a strong decrease with the frequency. The SBR/SO compound exhibited the lowest complex viscosity. The SBR/NO, SBR/5MSO and SBR/11MSO compounds exhibited similar values but higher than that of the SBR/SO compound. The SBR/33MSO and SBR/47MSO compounds exhibited similar values of complex viscosity and higher than those of the other compounds. The complex viscosity of the SBR/SO and SBR/MSO compounds slightly increased with an increase of the modification level, the trend of the complex viscosities was in agreement with the G' and G" of the samples due to the increase of viscosity of the MSOs with the increase of the modification level.

Frequency dependences of the G', G", tan δ, and complex viscosity of various SBR vulcanizates showed the SBR/NO vulcanizate exhibited a higher value of G' than that of the SBR/SO vulcanizate and indicated a behavior of a typical highly crosslinked polymer showing a G" plateau at low frequencies. Values of G' of various SBR/MSO vulcanizates were decreased with the increasing level of modification of SO and were lower than that of the SBR/NO vulcanizate. The G' of the SBR/MSO vulcanizates became more frequency dependent with an increase of the modification level. Such a behavior is characteristic of a lightly crosslinked polymer. However, with an addition of the higher amount of curatives, as in the case of the SBR/5MSO-2 and SBR/11MSO-2 vulcanizates, values of G' become closer to that of the SBR/NO vulcanizate. With the increase of the modification level, the crosslink density of SBR/MSO vulcanizates decreased. After adjusting the curatives recipe, the crosslink densities of the SBR/5MSO-2 and SBR/11MSO-2 vulcanizate were increased and compared to those of the vulcanizates with the original recipe. The values of G" of all vulcanizates increased with the frequency. The values of G" of the SBR/NO, SBR/SO, SBR/5MSO and SBR/11MSO-2 vulcanizates were similar. The SBR/11MSO vulcanizate indicated a slightly higher value of G" than that of the SBR/5MSO vulcanizate. The SBR/33MSO and SBR/47MSO vulcanizates exhibited higher values of G" than that of the SBR/11MSO vulcanizate. The SBR/5MSO-2 vulcanizate showed the lowest value of G" among all the vulcanizates. It was seen that the SBR/NO, SBR/SO, SBR/5MSO-2 and SBR/11MSO-2 vulcanizates exhibited an increase of tan δ with an increase of the frequency in the observed frequency range. The SBR/11MSO, SBR/33MSO and SBR/47MSO vulcanizates exhibited a decrease in tan δ at high frequencies, with the SBR/33MSO and SBR/47MSO vulcanizates exhibiting a peak in tan δ vs. frequency curves. This phenomenon was evidently due to the decreasing crosslink density with an increase of the modification level. After adjusting the recipe, the SBR/5MSO-2 exhibited the lowest tan δ values among all the samples. The SBR/NO and SBR/11MSO-2 vulcanizates showed similar values of tan δ. Tan δ of SBR/SO, SBR/5MSO, SBR/11MSO, SBR/33MSO and SBR/47MSO vulcanizates consistently increased with the modification level. The complex viscosity of various SBR vulcanizates followed the same tendency as the values of G' of all the samples. All the vulcanizates showed a strong decrease of the viscosity with the frequency.

The dependence of G' on the strain amplitude of various SBR compounds and SBR vulcanizates showed that all the compounds showed a reduction of G' with the strain amplitude (Payne effect). The G' curves vs. strain amplitude of the various compounds were mostly parallel with each other indicating a similar Payne effect. Also, it was seen that all the SBR vulcanizates exhibited almost similar Payne effect, except SBR/47MSO vulcanizate showed a slightly increasing Payne effect. The results indicated that the presence of the different plasticizers had no significant influence on the filler-filler interaction. Evidently, the dispersion of filler in different compounds and vulcanizates were similar to each other.

4. Thermal Properties

The TGA curves of various extender oils, SBR compounds and vulcanizates indicated that the SO had the best thermal stability. As the modification level increased, the thermal stability of the MSOs gradually decreased due to the increase of the DCPD residue. The NO started to vaporize at about 100° C. and completely vaporized at about 270° C. The flash point of the NO Plasticizer LN was around 171° C., and the flash point for the SO was over 260° C. A stronger intermolecular force of SO and MSO of lower level of modification made their thermal stability better than that of NO, thus improving safety in rubber industry. TGA curves of various SBR compounds and vulcanizates indicated that SBR/SO compound and vulcanizate showed the best thermal stability, and with the increase of the modification level, the thermal stability of the SBR/MSO compounds and vulcanizates gradually decreased. The SBR/SO, SBR/5MSO and SBR/11MSO compounds and vulcanizates exhibited similar and better thermal stability than those of the SBR/33MSO and SBR/47MSO compounds and vulcanizates. SBR compound and vulcanizate containing NO exhibited the lowest thermal stability due to the inferior thermal stability of NO. It was also observed that the residue of various SBR compounds was about 31.5 wt %. This residue was due to the presence of the 60 phr of CB in the SBR compound. The residue of various SBR vulcanizate was about 32.5 wt % due to the presence of 60 phr of CB and 5 phr of ZnO.

The DSC curves of various extender oils including NO, SO and various MSOs, various SBR compounds without curatives and various SBR vulcanizates were compared. NO exhibited a glass transition at −80.6° C. without any additional transitions. SO exhibited two melting peaks at −37.0° C. and −23.4° C. The two melting peaks of SO were shown and attributed to the two main fatty acids in the SO, linoleic acid and oleic acid. At the modification level of 5%, the melting peak merged together. At a higher modification level, the melting peak became flat due to the fact that the modification introduced more norbornylene groups creating hindrance and thus reduced the crystallinity of the fatty acid. A glass transition temperature, $T_g$, of SBR compounds and vulcanizates was determined. The results are listed in Table 10 below.

TABLE 10

$T_{95}$ and Tg of various SBR compounds and Tg of their vulcanizates

| | Compound $T_{95}$ (min) | Compound Tg (° C.) | Vulcanizate Tg (° C.) |
|---|---|---|---|
| SBR/NO | 18.2 | −45.8 | −38.8 |
| SBR/SO | 25.2 | −52.2 | −42.3 |
| SBR/5MSO | 14.4 | −48.8 | −41.2 |
| SBR/11MSO | 11.5 | −48.1 | −40.5 |
| SBR/33MSO | 12.8 | −42.2 | −37.7 |
| SBR/47MSO | 13.0 | −39.7 | −33.8 |
| SBR/5MSO-2 | 7.6 | −48.8 | −40.4 |
| SBR/11MSO-2 | 7.6 | −48.1 | −39.9 |

It was clear from these results that the SBR/SO compound showed the lowest Tg of −52.2° C. and the Tg of SBR/MSO compounds increased with an increase of the modification level. The SBR/NO compound exhibited a Tg of −45.8° C., slightly higher than that of the SBR/11MSO compound. It was also observed that the Tg of various SBR vulcanizates increased compared to those of the SBR compounds due to the vulcanization. The SBR/NO vulcanizate exhibited a Tg of −38.8° C., the SBR/SO vulcanizate exhibited a Tg of −42.3° C., which was 3.5° C. lower than that of the SBR/NO vulcanizate. The SBR/33MSO and SBR/47MSO vulcanizates exhibited higher Tg than that of the SBR/NO vulcanizate. Results indicated that the SBR/SO and SBR/MSO vulcanizates provided a better low temperature performance than the SBR/NO vulcanizate.

5. Reaction of so/MSO with Curatives

Figure 3:
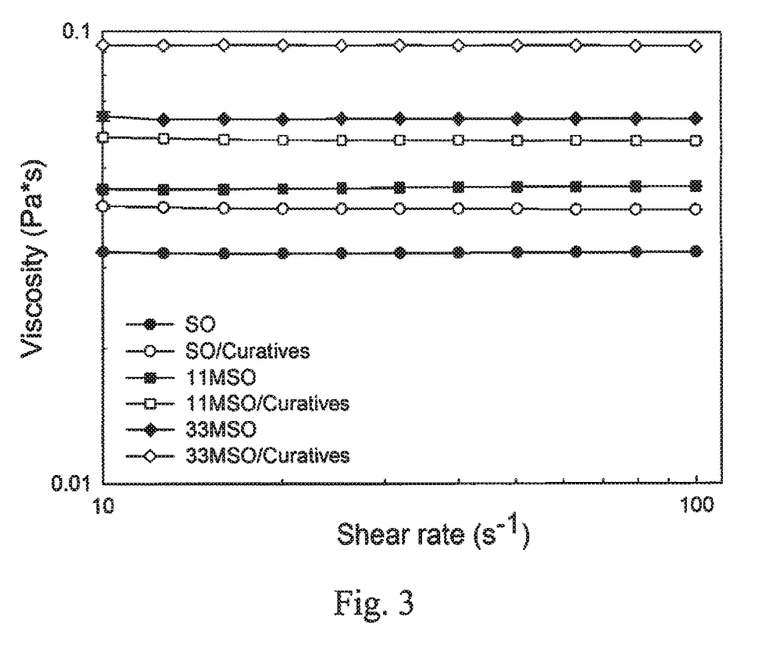
FIG. 3 shows the viscosity of oils with and without curatives after heating according to the present invention.

To study the reaction of SO and MSO with curatives, oils with curatives and without curatives were heated in the DSC at 160° C. The DSC curves of the pure oils at this temperature showed smooth curves without any noticeable changes. However, the DSC curves of the oils with curatives showed obvious exothermic peaks which indicated that the oils reacted with the curatives and cured at this temperature. The 33MSO with curatives exhibited the largest curing peak among the three samples, followed by 11MSO with curatives, and SO with curatives having the smallest peak. This behavior implied that the higher level of modification of the SO led to more reaction of oils with the curatives. After the experiments, no obvious color change was observed for the oils without curatives. The oils remained as transparent light yellow liquid. However, all the oils with curatives turned into opaque brown color liquid. Curing observed in oils in the presence of curatives should increase the viscosity of oils. To prove this, their viscosity measurement was carried out. FIG. 3 shows the viscosity of oils with and without curatives after heating. All the samples showed a Newtonian behavior in the tested range of shear rates. After the reaction, the viscosity of SO, 11MSO and 33MSO in the presence of curatives was increased by 24.2%, 29.8% and 45.9%, respectively. The result demonstrated that with an increase of the modification level, the oil could react more with curatives leading to higher increase in the viscosity.

The exothermal behavior and the increase in viscosity showed that the SO and MSO could react with curatives causing consumption of the curatives, leading to a lower crosslink density of the SBR/SO and various SBR/MSO vulcanizates as discussed above. The SO and MSO can probably be cured on the rubber chains and also crosslinked with each other. The MSOs contain more reactive double bonds compared to SO and therefore can react more upon heating. It seems that the MSOs play an important role in the curing process of the rubber compounds.

6. Curing Behaviors

The curing curves of various SBR compounds and the curing time $T_{95}$ was determined from curing curves with results are shown in Table IV. The SBR/SO compound had the longest $T_{95}$ (25.2 min) due to the marching torque at large time, but exhibited a higher maximum torque, $M_H$, than those of all the SBR/MSO compounds. With the increase of the modification level, the $T_{95}$ and $M_H$ are decreased due to the increasing reactivity of the MSO with sulfur. The SBR/NO compound showed longer curing time than all the SBR/MSO compounds but the highest $M_H$. The SBR/5MSO-2 and SBR/11MSO-2 compounds showed the shortest curing time due to the presence of higher amount of curatives, and exhibited the $M_H$ value close to the SBR/NO compound. This finding correlates well with crosslink density measurements of vulcanizates reported earlier.

7. Tensile Properties

The strain-stress curves of the various SBR vulcanizates with a comparison of M100, M300, elongation at break and tensile strength of these vulcanizates as shown in Table 11.

TABLE 11

Tensile property, abrasion loss and hardness of various SBR vulcanizates

|  | M100 (MPa) | M300 (MPa) | Elongation at Break (%) | Tensile Strength (MPa) | Abrasion Loss (g) | Hardness (Shore A) |
|---|---|---|---|---|---|---|
| SBR/NO | 2.736 ± 0.038 | 12.358 ± 0.022 | 321.3 ± 4.2 | 13.57 ± 0.27 | 0.142 ± 0.002 | 65 |
| SBR/SO | 2.219 ± 0.020 | 9.868 ± 0.178 | 427.3 ± 3.1 | 15.76 ± 0.35 | 0.129 ± 0.003 | 61 |
| SBR/5MSO | 1.407 ± 0.036 | 5.484 ± 0.127 | 671.8 ± 10.9 | 17.08 ± 0.38 | 0.144 ± 0.005 | 59 |
| SBR/11MSO | 1.275 ± 0.020 | 4.508 ± 0.052 | 755.2 ± 6.4 | 16.56 ± 0.26 | 0.172 ± 0.002 | 59 |
| SBR/33MSO | 1.226 ± 0.018 | 3.420 ± 0.060 | 943.0 ± 15.6 | 13.05 ± 0.18 | 0.199 ± 0.004 | 61 |
| SBR/47MSO | 1.193 ± 0.008 | 3.030 ± 0.043 | 776.1 ± 8.6 | 10.07 ± 0.19 | 0.239 ± 0.010 | 63 |
| SBR/5MSO-2 | 2.026 ± 0.028 | 9.099 ± 0.078 | 512.5 ± 2.1 | 18.63 ± 0.19 | 0.134 ± 0.002 | 60 |
| SBR/11MSO-2 | 2.191 ± 0.005 | 8.628 ± 0.098 | 560.0 ± 8.5 | 19.27 ± 0.38 | 0.148 ± 0.003 | 61 |

The SBR/NO vulcanizate had an elongation of 321.3% and a tensile strength of 13.57 MPa, the SBR/SO vulcanizate had an elongation of 427.3% and a tensile strength of 15.76 MPa. Clearly, it exhibited both the higher elongation at break and tensile strength compared to that of the SBR/NO vulcanizate. For the various SBR/MSO vulcanizates, the elongation at break and strength were 671.8% and 17.08 MPa for SBR/5MSO, 755.2% and 16.56 MPa for SBR/11MSO, 943.0% and 13.05 MPa for SBR/33MSO and 776.1% and 10.07 MPa for SBR/47MSO. By increasing level of curatives, the moduli of the SBR/5MSO-2 and SBR/11MSO-2 vulcanizates were close to that of the SBR/SO vulcanizate. These vulcanizates exhibited an elongation at break and tensile strength of 512.5% and 18.63 MPa and 560.0% and 19.27 MPa, respectively. However, the M100 and M300 of SBR/NO vulcanizate were higher than that of the vulcanizates containing SO and MSOs.

It was observed that after the modification of the SO, the SBR/MSO vulcanizates exhibited a tremendous increase in the elongation at break. The SBR/33MSO vulcanizate exhibited the highest elongation at break, which was about three times of the SBR/NO vulcanizate. Also the SBR/5MSO and SBR/11MSO vulcanizates exhibited a higher tensile strength and elongation at break compared to those of the SBR/NO and SBR/SO vulcanizates. The SBR/47MSO vulcanizate exhibited a similar elongation at break as the SBR/11MSO vulcanizate. However, it had the lowest tensile strength among all the samples due to its low crosslink density. The SBR/5MSO-2 and SBR/11MSO-2 vulcanizates exhibited lower modulus compared to the SBR/SO vulcanizate and much higher tensile strength than the SBR/NO vulcanizate. It can be concluded that the SO and MSOs could be covulcanized in the crosslink network, and possibly alter the crosslink structure and crosslink density of the vulcanizates, creating more polysulfidic crosslinks. The polysulfidic crosslinks could slip under high stress, cleave and reform and prevent the premature breakage of the overstressed rubber chains. Therefore, it could result in improved room temperature tensile properties of vulcanizates.

Table 11 also showed the hardness (Shore A) of various SBR vulcanizates. The SBR/SO vulcanizate exhibited a lower hardness than the SBR/NO vulcanizate. With an increase of the modification level, the hardness of the SBR/MSO vulcanizates increased from 59 to 63. Compared to the SBR/NO vulcanizate, the decrease in hardness of the SBR/SO and SBR/MSO vulcanizates was evident due to the decrease of the crosslink density. With the increase of the modification level, there was more DCPD residue in the MSO resulting in a slight increase of the hardness. The SBR/5MSO-2 and SBR/11MSO-2 vulcanizates containing higher level of curatives show increased hardness than those of the SBR/5MSO and SBR/11MSO vulcanizates due to their higher crosslink densities.

Table 11 also depicted the results of the abrasion test. The SBR/SO vulcanizate exhibited a slightly better abrasion resistance than that of the SBR/NO vulcanizate. It was probably attributed to the coupling effect of the SO between the CB and the SBR leading to a better polymer-filler interaction. With an increase of the modification level, the SBR/MSO vulcanizates showed an increase in weight loss due to the decreasing crosslink density. The SBR/5MSO vulcanizate showed similar value of weight loss compared to that of the SBR/NO vulcanizate. After increasing the curatives amount, the SBR/5MSO-2 vulcanizate showed the best abrasion resistance among all the vulcanizates.

7. DMA Test and Performance Predictors

A comparison of the temperature dependencies of E', E" and tan δ of various SBR vulcanizates showed the values of E' in the glassy state of all the vulcanizates were similar to each other. At high temperature region corresponding to the rubbery state, the SBR/NO vulcanizate had the highest value of E', followed by SBR/5MSO-2 and SBR/11MSO-2 vulcanizates. Various SBR/SO and SBR/MSO vulcanizates exhibited values close to each other. The E" values of all the SBR vulcanizates in the glassy state were slightly different, with values for SBR/NO and SBR/47MSO being similar, but lowest among all the vulcanizates. In the rubbery state, the SBR/NO and SBR/47MSO vulcanizates exhibited the highest values among all the vulcanizates and similar with each other. The SBR/33MSO vulcanizate exhibited a lower E" value than that of the SBR/47MSO vulcanizate. The SBR/SO, SBR/5MSO, SBR/11MSO, SBR/5MSO-2 and SBR/11MSO-2 vulcanizates exhibited similar E" values. All the SBR vulcanizates had a single tan δ peak. It was noted that the glass transition temperatures of various SBR vulcanizates determined from the DMA test based on the temperature corresponding to the tan δ peak showed the same trend as the glass transition temperatures of these vulcanizates obtained from the DSC test. The tan δ value converged to a similar value at low temperature region. At high temperature region, the SBR/MSO vulcanizates had higher values of tan δ compared to SBR/SO and SBR/NO vulcanizates. Also, the tan δ values of the SBR/MSO increased with an increase of modification level.

Tan δ and E' values of vulcanizates at certain temperatures can be used as a predictor for tire rubber performance. Normalized radar graph of SBR vulcanizates using SBR/NO vulcanizate as a control sample showed that the SBR/SO, SBR/5MSO and SBR/11MSO vulcanizates exhibited a similar tan δ value at 10° C., indicating a similar wet traction performance. However, the SBR/33MSO and SBR/47MSO exhibited a higher tan δ value at 10° C. indicating a better wet traction performance compared to the control sample. The SBR/SO vulcanizate had a similar tan δ at 30° C. compared to the control sample indicating a similar dry traction performance, while the SBR/MSO vulcanizates indicated an increase in the dry traction performance with an increase of modification level. However, all the SBR/SO and SBR/MSO vulcanizates exhibited a lower value of E' at 30° C. indicating a lower dry handling performance. Tan δ value of −10° C. was used to predict the snow traction performance. It was seen that the SBR/SO, SBR/5MSO and SBR/11MSO vulcanizates exhibited slightly lower snow traction performance than the control sample, but the SBR/33MSO and SBR/47MSO vulcanizates exhibited better snow traction performance. The SBR/SO and various SBR/MSO vulcanizates all exhibited a higher tan δ at 60° C. indicating a higher rolling resistance compared to the SBR/NO vulcanizates. However, after adjusting the recipe by adding more curatives as in the SBR/5MSO-2 and SBR/11MSO-2 vulcanizates, the predicted rolling resistance decreased and the predicted wet, snow and dry traction performances were significantly improved, becoming similar to those of the control sample of the original recipe.

8. Conclusions

SO was modified into various modification levels and compounded with SBR. The swelling test indicated that with an increase of the modification, the gel fraction of the SBR/MSO vulcanizates slightly increased, and the crosslink density and bound rubber fraction decreased. The decrease in the crosslink density of the SBR/SO and various SBR/MSO vulcanizates was due to the reaction of the SO and MSO with the curatives. The oil altered the crosslink structure, resulting in a tremendous improvement in product properties. For thermal properties, the SBR/SO compound and its vulcanizate exhibited the lowest $T_g$ leading to better low temperature properties. The $T_g$ of various SBR/MSO compounds and vulcanizates was increased with an increase of the modification level. The SBR/SO compound and vulcanizate showed the best thermal stability. The thermal stability decreeseed with an increase of the modification level, but all the SBR/MSO compounds and vulcanizates exhibited better thermal stability than that of the SBR/NO compound and vulcanizate, respectively. The SBR/SO and SBR/MSO compounds had shorter curing time, similar induction period and lower maximum torque compared to those of the SBR/NO compounds.

Experimental results indicated that the SBR/MSO vulcanizates showed a tremendous increase in the elongation at break compared to the SBR/NO vulcanizates. The SBR/33MSO vulcanizate exhibited a more than 200% increase in the elongation at break than that of the SBR/NO and SBR/SO vulcanizates. The SBR/5MSO, SBR/11MSO, SBR/5MSO-2 and SBR/11MSO-2 vulcanizates exhibited an increase in both the elongation at break and the tensile strength simultaneously. Abrasion resistance of the SBR/SO vulcanizate was better than that of the SBR/NO vulcanizate. With an increase of the modification level, the abrasion resistance of various SBR/MSO vulcanizates decreased, but it was improved by increasing the curative content. The DMA test predicted the performance of various SBR/SO and SBR/MSO vulcanizates compared to the SBR/NO vulcanizate. With an increase of the modification level of the SO, the SBR/MSO vulcanizates exhibited better traction, but higher rolling resistance. After adjusting the recipe by increasing the amount of curatives as in the SBR/5MSO-2 and SBR/11MSO-2 vulcanizates, similar traction and lower rolling resistance was predicted compared to the SBR/NO vulcanizates. In general, the SBR/MSO vulcanizates have advantages in some aspects such as thermal and tensile properties. The MSO addition to SBR had a promising possibility to replace part of or all of the conventional petroleum extender oils in the tire rubber product improving safety in rubber industry.

What is claimed is:

1. A rubber formulation comprising:
   a rubber including norbornylized seed oil, wherein said norbornylized seed oil is a seed oil modified with norbornylene groups.

2. The rubber formulation of claim 1, wherein said rubber is selected from natural and synthetic rubbers.

3. The rubber formulation of claim 1, wherein said seed oil is selected from soybean oil, linseed oil, sunflower oil, safflower oil, palm oil, and kernel oil.

4. The rubber formulation of claim 1, wherein said seed oil, prior to modification with norbornylene groups, has fatty acid chains with carbon-carbon double bonds, and said seed oil is modified with norbornylene groups by having at least some of said carbon-carbon double bonds converted into norbornylene groups.

5. The rubber formulation of claim 4, wherein from 3% or more to 50% or less of the carbon-carbon double bonds of said seed oil is converted into norbornylene groups.

6. The rubber formulation of claim 4, wherein from 3% or more to 20% or less of the carbon-carbon double bonds of said seed oil is converted into norbornylene groups.

7. The rubber formulation of claim 1, wherein said rubber formulation includes from 5 to 40 parts norbornylized seed oil per hundred parts rubber.

8. The rubber formulation of claim 1, wherein said rubber formulation includes from 10 to 30 parts norbornylized seed oil per hundred parts rubber.

9. The rubber formulation of claim 1, wherein said rubber formulation further comprises a filler selected from carbon black, silica filler, nanoclay, carbon nanotubes, carbon nanofibers, nanodiamonds, graphite, graphene and mixtures thereof.

10. The rubber formulation of claim 1, wherein said rubber is a natural and synthetic rubber and said norbornylized seed oil is norbornylized soybean oil.

11. A process for creating a rubber formulation comprising:
    adding a norbornylized seed oil to a rubber, wherein the norbornylized seed oil is a seed oil modified with norbornylene groups.

12. The process for creating a rubber formulation as in claim 11, wherein said rubber is selected from natural and synthetic rubbers.

13. The process for creating a rubber formulation as in claim 11, wherein said seed oil is selected from soybean oil, linseed oil, sunflower oil, safflower oil, palm oil, kernel oil, or the like.

14. The process for creating a rubber formulation as in claim 11, further comprising the step of creating the norbornylized seed oil by reacting the seed oil with dicyclopentadiene.

15. The process for creating a rubber formulation as in claim 14, wherein, in said step of creating the norbornylized seed oil, the stoichiometric ratio of dicyclopentadiene to carbon-carbon double bonds of the seed oil is from 1 to 10 to 5:1.

16. The process for creating a rubber formulation as in claim 11, wherein, in said step of creating the norbornylized seed oil, at least 5% or more to 40% or less of the carbon-carbon double bonds of the seed oil are converted into norbornylene groups.

17. The process for creating a rubber formulation as in claim 11, wherein, in said step of adding a norbornylized seed oil, from 3 to 40 parts norbornylized seed oil per hundred parts rubber is added to the rubber.

18. The process for creating a rubber formulation as in claim 11, further comprising the step of adding a filler to the rubber, wherein said filler is selected from carbon black, silica filler, nanoclay, carbon nanotubes, carbon nanofibers, nanodiamonds, graphite, graphene and mixtures thereof.

19. The process for creating a rubber formulation as in claim 18, wherein, in said step of adding a filler, from 10 to 80 parts carbon black per hundred parts rubber is added to the rubber.

20. The process for creating a rubber formulation as in claim 11, further comprising the step of curing the rubber.

21. A process for creating a vulcanized composition, the process comprising vulcanizing a rubber formulation:
    including norbornylized seed oil, wherein said norbornylized seed oil is a seed oil modified with norbornylene groups,
    wherein the vulcanized composition has a greater elongation at break than an identical vulcanized composition prepared using a rubber formulation that includes an otherwise identical non-norbornylized seed oil.

* * * * *